US012575564B2

(12) United States Patent
Kamei

(10) Patent No.: US 12,575,564 B2
(45) Date of Patent: Mar. 17, 2026

(54) METHOD FOR DISINFECTING PLANT

(71) Applicant: KAO CORPORATION, Tokyo (JP)

(72) Inventor: Masatoshi Kamei, Wakayama (JP)

(73) Assignee: KAO CORPORATION, Tokyo (JP)

( * ) Notice: Subject to any disclaimer, the term of this patent is extended or adjusted under 35 U.S.C. 154(b) by 586 days.

(21) Appl. No.: 18/012,329

(22) PCT Filed: Jul. 29, 2021

(86) PCT No.: PCT/JP2021/028002
§ 371 (c)(1),
(2) Date: Dec. 22, 2022

(87) PCT Pub. No.: WO2022/044680
PCT Pub. Date: Mar. 3, 2022

(65) Prior Publication Data
US 2023/0255199 A1 Aug. 17, 2023

(30) Foreign Application Priority Data

Aug. 28, 2020 (JP) ................................. 2020-144308

(51) Int. Cl.
| | |
|---|---|
| *A01N 31/02* | (2006.01) |
| *A01N 25/02* | (2006.01) |
| *A01N 25/30* | (2006.01) |
| *A01P 1/00* | (2006.01) |
| *A01P 3/00* | (2006.01) |

(52) U.S. Cl.
CPC ............. *A01N 31/02* (2013.01); *A01N 25/02* (2013.01); *A01N 25/30* (2013.01); *A01P 1/00* (2021.08); *A01P 3/00* (2021.08)

(58) Field of Classification Search
CPC ........ A01N 31/02; A01N 25/02; A01N 25/30; A01P 1/00; A01P 3/00
See application file for complete search history.

(56) References Cited

U.S. PATENT DOCUMENTS

| | | | |
|---|---|---|---|
| 7,465,469 B2 * | 12/2008 | Ben-Yehoshua ....... | A01N 45/00 426/333 |
| 2004/0234662 A1 | 11/2004 | Ben-Yehoshua | |
| 2013/0196854 A1 | 8/2013 | Kamei et al. | |
| 2015/0051278 A1 | 2/2015 | Kamei | |

FOREIGN PATENT DOCUMENTS

| | | | | | |
|---|---|---|---|---|---|
| CN | 1447650 | A | 10/2003 | | |
| CN | 1592578 | A | 3/2005 | | |
| CN | 103209588 | A | 7/2013 | | |
| CN | 104093307 | A | 10/2014 | | |
| CN | 106922706 | A | 7/2017 | | |
| CN | 107114368 | A | 9/2017 | | |
| JP | S53-94037 | A | 8/1978 | | |
| JP | H11-310506 | A | 11/1999 | | |
| JP | 2005504102 | A | 2/2005 | | |
| JP | 2010138101 | A | 6/2010 | | |
| JP | 2012184187 | A | 9/2012 | | |
| JP | 2014125445 | A | 7/2014 | | |
| JP | 2015054830 | A * | 3/2015 | | |
| WO | WO-0215697 | A2 | 2/2002 | | |
| WO | WO-0215697 | A3 | 2/2002 | | |
| WO | WO-2012029893 | A1 * | 3/2012 | ............ | A01N 25/04 |
| WO | WO-2020066570 | A1 | 4/2020 | | |

OTHER PUBLICATIONS

WO-2012029893-A1 translated (Year: 2012).*
Combined Office Action and Search Report issued Jun. 26, 2023 in Chinese Patent Application No. 202180010599.5 (with English translation), 11 pages.
International Search Report issued Oct. 19, 2021 in PCT/JP2021/028002 (with English translation), 6 pages.
English translation of International Preliminary Report on Patentability and Written Opinion issued Mar. 9, 2023 in PCT/JP2021/028002, 6 pages.

* cited by examiner

*Primary Examiner* — Robert A Wax
*Assistant Examiner* — John Seungjai Kwon
(74) *Attorney, Agent, or Firm* — Element IP, PLC

(57) ABSTRACT

A method for disinfecting a plant including a step of applying to the plant a disinfectant treatment liquid for plants, the disinfectant treatment liquid containing, (A) a straight-chain aliphatic alcohol with 8 or more and 12 or less carbons as a disinfectant component (hereinafter referred to as component (A)), (B) a polyoxyalkylene sorbitan fatty acid ester (hereinafter referred to as component (B)) and water, wherein a mass ratio between the content of component (A) and the content of component (B), (B)/(A), is 0.05 or more and 0.9 or less.

12 Claims, 1 Drawing Sheet

(A) (B)
(C) (D)
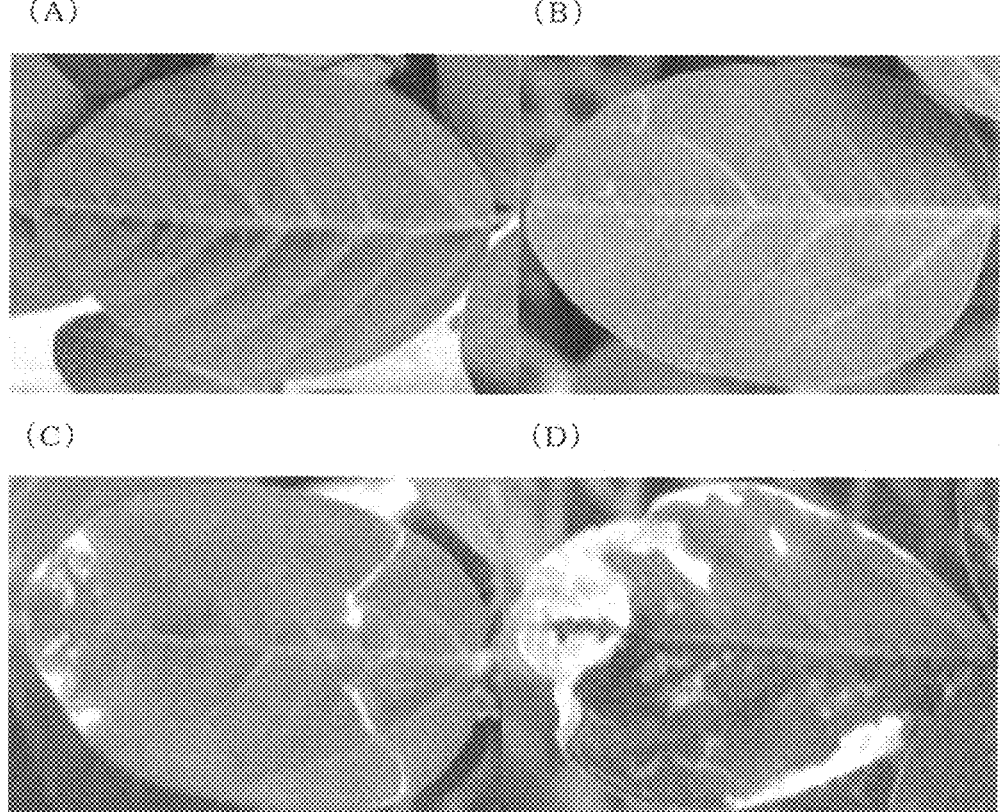

METHOD FOR DISINFECTING PLANT

FIELD OF THE INVENTION

The present invention relates to an eco-friendly and safety-conscious method for disinfecting a plant.

BACKGROUND OF THE INVENTION

Plant pathogens inhibit the growth or reduce the quality of agricultural or horticultural crops to do severe damage to the plants. Currently, organochlorine (TPN, captan), benzoimidazole, acid amide, guanidine, carbamate, organophosphorus, oxine copper pesticides and other chemical synthetic pesticides are mainly used for preventing or removing pathogens. Excessive pesticide application of such chemical synthetic pesticides develops drug resistance in pathogens, and therefore, pesticides that are safe and drug resistance is less likely to occur are desired. Further, there are also concerns about environmental impacts or burdens on workers caused by excessive application of chemical synthetic pesticides.

JP-A 2012-184187 discloses an agrochemical efficacy enhancing agent composition comprising, (A) one or more compounds selected from a specific ethoxylate-type compound, a specific polyoxyethylene fatty acid ester, a specific polyoxyethylene sorbitan fatty acid ester, a specific (poly) glycerin fatty acid ester and a specific alkyl saccharide, and (B) one or more compounds selected from an alcohol having a straight-chain or branched-chain alkyl group with 8 to 14 carbons.

JP-A 2014-125445 discloses an agrochemical composition comprising under specific conditions, (A) one or more compounds selected from a specific ethoxylate-type compound, a specific polyoxyethylene fatty acid ester, a specific polyoxyethylene sorbitan fatty acid ester, a specific (poly) glycerin fatty acid ester and a specific alkyl saccharide, (B) a specific alkoxylate compound including a propyleneoxy group or a specific aliphatic alcohol, (C) a specific amine-type surfactant, (D) a specific agrochemical active ingredient and water.

JP-A 2015-54830 discloses a method for disinfecting a plant comprising a step of applying a treatment liquid to the plant, wherein the treatment liquid is substantially free of any agrochemical active ingredient selected from active ingredients of disinfectants, and comprises, (A) one or more compounds selected from (A1) a specific polyoxyethylene fatty acid ester and (A2) a specific (poly)glycerin fatty acid ester, (B) one or more compounds selected from (B1) a specific aliphatic alcohol and water, wherein the total content of compounds (A) and (B) falls within a predetermined range.

JP-A 2005-504102 discloses a microbiocidal aqueous formulation comprising, (i) effective amount of at least one essential oil component, or derivatives thereof, said derivatives thereof obtained by exposure to light or by oxidation, or mixtures thereof, and (ii) at least one additional stabilizer selected from the group consisting of ethanol in an amount of from 10% to about 50%, an emulsifier, an antioxidant, or an encapsulating agent.

SUMMARY OF THE INVENTION

Disinfectant compositions for plants that include agrochemical active ingredients of conventional disinfectants or the like pose a problem that their action on the inhibition of biochemical reactions in fungal cells modifies genes acting on such biochemical reactions in the fungal cells, so that resistant fungi are likely to emerge, resulting in reduced disinfection effects of the disinfectant compositions for plants and reduced yields of plants.

Further, such disinfectant compositions for plants that include agrochemical active ingredients of conventional disinfectants or the like pose a problem that they are relatively less safe because they include agrochemical active ingredients, and restrictions placed on their use before plant harvest because the agrochemical active ingredients remain on plant surfaces make it impossible to use them even if damage is caused by diseases before plant harvest.

The present invention provides an eco-friendly and safety-conscious disinfectant composition for plants excellent in disinfection performance against a wide range of fungi including resistant fungi or the like, having no phytotoxic effects on plants and excellent in formulation recoverability, and an eco-friendly and safety-conscious disinfectant treatment liquid for plants excellent in disinfection performance against a wide range of fungi including resistant fungi or the like and having no phytotoxic effects on plants and a method for disinfecting a plant using the same.

The present invention relates to a disinfectant composition for plants containing, (A) a straight-chain aliphatic alcohol with 8 or more and 12 or less carbons as a disinfectant component (hereinafter referred to as component (A)) and (B) a polyoxyalkylene sorbitan fatty acid ester (hereinafter referred to as component (B)), wherein a mass ratio between the content of component (A) and the content of component (B), (B)/(A), is 0.05 or more and 0.9 or less.

Further, the present invention relates to a disinfectant treatment liquid for plants containing component (A), component (B) and water, wherein a mass ratio between the content of component (A) and the content of component (B), (B)/(A), is 0.05 or more and 0.9 or less.

Further, the present invention relates to a method for disinfecting a plant including a step of applying to the plant a disinfectant treatment liquid for plants, the disinfectant treatment liquid containing component (A), component (B) and water, wherein a mass ratio between the content of component (A) and the content of component (B), (B)/(A), is 0.05 or more and 0.9 or less.

Further, the present invention relates to a method for disinfecting a plant including a step of applying to the plant a disinfectant treatment liquid for plants, the disinfectant treatment liquid being composed of, essentially component (A), component (B), optionally (C) a solvent, and water, wherein a mass ratio between the content of component (A) and the content of component (B), (B)/(A), is 0.05 or more and 0.9 or less.

According to the present invention, provided are an eco-friendly and safety-conscious disinfectant composition for plants excellent in disinfection performance against a wide range of fungi including resistant fungi or the like, having no phytotoxic effects on plants and excellent in formulation recoverability, and an eco-friendly and safety-conscious disinfectant treatment liquid for plants excellent in disinfection performance against a wide range of fungi including resistant fungi or the like and having no phytotoxic effects on plants and a method for disinfecting a plant using the same.

BRIEF DESCRIPTION OF THE DRAWINGS

FIG. 1 shows photographs serving as the judgement criteria for a plant phytotoxicity test in Examples.

EMBODIMENTS OF THE INVENTION

[Disinfectant Composition for Plants]

The reason why the disinfectant composition for plants of the present invention is excellent in disinfection performance against a wide range of fungi including resistant fungi or the like is not wholly certain, but inferred to be as follows.

Disinfectant compositions for plants that include agro-chemical active ingredients of conventional disinfectants or the like pose a problem that their action on the inhibition of biochemical reactions in fungal cells modifies a small number of genes acting on such biochemical reactions in the fungal cells, so that resistant fungi are likely to emerge, resulting in reduced disinfection effects of the disinfectant compositions for plants. On the other hand, it is considered that the disinfectant composition for plants containing components (A) and (B) of the present invention kills fungi by acting on the entire fungal cell membranes to cause structural destruction, so that a large number of genetic mutations must take place for the emergence of resistant fungi, and the risk of the emergence of resistant fungi is low, or even if resistant fungi emerge, the composition does not lose disinfection effects because it acts on the entire cell membranes.

Further, the disinfectant composition for plants of the present invention, in which component (A) which is a food additive compound is used as a disinfectant component, does not need common agrochemical active ingredients of other disinfectants or the like, so that it is highly environmental and safe and can be used before plant harvest.

Further, the mechanism by which the disinfectant composition for plants of the present invention has disinfection effects is inferred to be as follows.

Component (A) of the present invention which is an aliphatic alcohol with a specific carbon number has moderate interaction with fungal cell surfaces and fungal cell membrane penetration action, so that it is easily adsorbed on fungal cell surfaces, and penetrates into fungal cell membranes, thereby destroying the cell membranes to exhibit disinfection effects. Further, component (B) of the present invention has moderate HLB and molecular occupation area, so that it has the effect of making component (A) more easily penetrate into cell membranes when components (A) and (B) are adsorbed on the fungal cell surfaces at a specific mass ratio. It is inferred that this synergistic effect of components (A) and (B) contributes to excellent disinfection effects of the disinfectant composition for plants of the present invention.

<Component (A)>

Component (A) of the present invention is a straight-chain aliphatic alcohol with 8 or more and 12 or less carbons. Component (A) serves as a disinfectant component.

Component (A) has 8 or more and 12 or less and preferably 10 carbons from the viewpoint of disinfection effects.

Component (A) is preferably a compound represented by the following general formula (A1):

$$R^{1a}-OH \qquad (A1)$$

wherein $R^{1a}$ is a straight-chain alkyl group with 8 or more and 12 or less carbons or a straight-chain alkenyl group with 8 or more and 12 or less carbons.

In the general formula (A1), $R^{1a}$ has 8 or more and 12 or less and preferably 10 carbons from the viewpoints of disinfection effects and formulation recoverability. $R^{1a}$ is preferably a straight-chain alkyl group.

Component (A) is preferably one or more selected from octanol, decanol and dodecanol, more preferably one or more selected from octanol and decanol, and further preferably decanol.

When decanol is included as component (A), the content of decanol in component (A) is preferably 50 mol % or more, more preferably 80 mol % or more, further preferably 90 mol % or more and furthermore preferably 99 mol % or more, and 100 mol % or less, and may be 100 mol %.

The disinfectant composition for plants of the present invention contains component (A) in an amount of preferably 10 mass % or more, more preferably 20 mass % or more, further preferably 30 mass % or more and furthermore preferably 40 mass % or more from the viewpoint of disinfection effects, and preferably 99 mass % or less, more preferably 95 mass % or less and further preferably 90 mass % or less from the viewpoint of formulation recoverability.

<Component (B)>

Component (B) of the present invention is a polyoxyalkylene sorbitan fatty acid ester. Component (B) has the function of making component (A) that is a disinfectant component easily penetrate into fungal cell membranes.

The raw material fatty acid of component (B) has preferably 8 or more, more preferably 10 or more, further preferably 12 or more, furthermore preferably 14 or more and furthermore preferably 16 or more, and preferably 24 or less, more preferably 20 or less, further preferably 18 or less and furthermore preferably 18 carbons from the viewpoints of disinfection effects, formulation recoverability and phytotoxicity.

The raw material fatty acid of component (B) preferably has a straight-chain or branched-chain alkyl group or a straight-chain or branched-chain alkenyl group, more preferably has a straight-chain alkyl group or alkenyl group, and further preferably has a straight-chain alkenyl group from the viewpoints of disinfection effects, formulation recoverability and phytotoxicity.

Note that the raw material fatty acid of component (B) refers to a fatty acid residue chemically bonded to sorbitan.

The raw material fatty acid of component (B) is preferably one or more selected from lauric acid, palmitic acid, stearic acid and oleic acid, more preferably one or more selected from lauric acid and oleic acid, and further preferably oleic acid.

The alkylene oxide in component (B) is preferably ethylene oxide or propylene oxide and more preferably ethylene oxide from the viewpoints of disinfection effects and formulation recoverability.

The average number of added moles of the alkylene oxide in component (B) is preferably 5 or more, more preferably 10 or more and further preferably 15 or more, and preferably 100 or less, more preferably 60 or less, further preferably 40 or less, furthermore preferably 30 or less and furthermore preferably 25 or less from the viewpoints of disinfection effects and formulation recoverability.

The degree of esterification of component (B) is preferably 1 or more and 3 or less and more preferably 1.

Suitable as component (B) is a polyoxyalkylene sorbitan fatty acid monoester in which the fatty acid has 8 or more, preferably 10 or more, more preferably 12 or more, further preferably 14 or more and furthermore preferably 16 or more, and 24 or less, preferably 20 or less, more preferably 18 or less and further preferably 18 carbons, and the average number of added moles of the alkylene oxide is 5 or more, preferably 10 or more and more preferably 15 or more, and 100 or less, preferably 60 or less, more preferably 40 or less, further preferably 30 or less and furthermore preferably 25 or less from the viewpoints of disinfection effects and formulation recoverability.

Suitable as component (B) is a polyoxyethylene sorbitan fatty acid monoester in which the fatty acid has 8 or more, preferably 10 or more, more preferably 12 or more, further preferably 14 or more and furthermore preferably 16 or more, and 24 or less, preferably 20 or less, more preferably 18 or less and further preferably 18 carbons, and the average number of added moles of the ethylene oxide is 5 or more, preferably 10 or more and more preferably 15 or more, and 100 or less, preferably 60 or less, more preferably 40 or less, further preferably 30 or less and furthermore preferably 25 or less from the viewpoints of disinfection effects and formulation recoverability.

When the polyoxyethylene sorbitan fatty acid monoester is included as component (B), the content of the polyoxyethylene sorbitan fatty acid monoester in component (B) is preferably 50 mol % or more, more preferably 80 mol % or more, further preferably 90 mol % or more and furthermore preferably 99 mol % or more, and 100 mol % or less, and may be 100 mol %.

The disinfectant composition for plants of the present invention contains component (B) in an amount of preferably 1 mass % or more, more preferably 5 mass % or more and further preferably 10 mass % or more from the viewpoint of formulation recoverability, and preferably 50 mass % or less, more preferably 40 mass % or less and further preferably 30 mass % or less from the viewpoint of disinfection effects.

The mass ratio between the content of component (A) and the content of component (B) in the disinfectant composition for plants of the present invention, (B)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects, formulation recoverability and phytotoxicity.

When component (A) includes decanol (hereinafter referred to as component (A1)), the mass ratio between the content of component (A1) and the content of component (B) in the disinfectant composition for plants of the present invention, (B)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects, formulation recoverability and phytotoxicity.

When component (B) includes a polyoxyethylene sorbitan oleic acid monoester (hereinafter referred to as component (B1)), the mass ratio between the content of component (A) and the content of component (B1) in the disinfectant composition for plants of the present invention, (B1)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects, formulation recoverability and phytotoxicity.

When components (A) and (B) include components (A1) and (B1), respectively, the mass ratio between the content of component (A1) and the content of component (B1) in the disinfectant composition for plants of the present invention, (B1)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects, formulation recoverability and phytotoxicity.

<Component (C)>

The disinfectant composition for plants of the present invention preferably further contains a solvent as component (C) from the viewpoint of formulation recoverability.

Examples of component (C) include one or more selected from propylene glycol, butanol, 2-ethylhexanol, benzyl alcohol, ethyl lactate, propanol, ethylene glycol, diethylene glycol, propylene glycol, glycerin, ethyl acetate, methanol, ethanol, butyl acetate, methyl lactate and butyl lactate, and from the viewpoints of disinfection effects and formulation recoverability, preferable are one or more selected from propylene glycol, butanol, 2-ethylhexanol, benzyl alcohol, ethyl lactate, propanol, ethylene glycol, diethylene glycol, propylene glycol and glycerin, and more preferable are one or more selected from propylene glycol, butanol, 2-ethylhexanol, benzyl alcohol and ethyl lactate.

The disinfectant composition for plants of the present invention contains component (C) in an amount of preferably 5 mass % or more, more preferably 10 mass % or more, further preferably 15 mass % or more, furthermore preferably 20 mass % or more, furthermore preferably 25 mass % or more and furthermore preferably 30 mass % or more, and preferably 70 mass % or less, more preferably 60 mass % or less, further preferably 50 mass % or less, furthermore preferably 45 mass or less and furthermore preferably 40 mass % or less from the viewpoint of formulation recoverability.

The disinfectant composition for plants of the present invention is preferably substantially free of any agrochemical active ingredient selected from respective active ingredients of disinfectants, insecticides, miticides and herbicides, and more preferably substantially free of especially an agrochemical active ingredient in which a disinfectant other than component (A) is used as an active ingredient from the viewpoints of the environment and safety. Here, the term "agrochemical active ingredient" refers to an active ingredient of an agrochemical. Examples of the agrochemical active ingredient include, for example, those described in Pesticide Handbook, 2011 edition (the general incorporated association Japan Plant Protection Association, issued on Feb. 25, 2011). However, component (A) is excluded from the agrochemical active ingredient.

The disinfectant composition for plants of the present invention is preferably substantially free of any agrochemical active ingredient selected from respective active ingredients of disinfectants, insecticides, miticides and herbicides, and more preferably substantially free of especially an agrochemical active ingredient in which a disinfectant other than component (A) is used as an active ingredient from the viewpoints of the environment and safety.

In other words, the present invention provides a disinfectant composition for plants composed of, essentially component (A), component (B), and optionally component (C).

Here, the term "essentially" in the context of the disinfectant composition for plants of the present invention means that the composition may contain a component other than components (A), (B) and (C) in a range that the action or effects of the present invention are not affected, but it does not contain a component that the action or effects of the present invention are affected, for example, an agrochemical active ingredient in which a disinfectant other than components (A) and (B) is used as an active ingredient.

The content of any agrochemical active ingredient selected from respective active ingredients of disinfectants, insecticides, miticides and herbicides in the disinfectant composition for plants of the present invention is preferably 50 mass % or less, more preferably 30 mass % or less, further preferably 10 mass % or less, furthermore preferably 5 mass % or less, furthermore preferably 2.5 mass % or less, furthermore preferably 1 mass % or less and furthermore preferably 0.1 mass % or less from the viewpoint of formulation recoverability.

The content of the agrochemical active ingredient in which a disinfectant other than component (A) is used as an active ingredient in the disinfectant composition for plants of the present invention is preferably 50 mass % or less, more preferably 30 mass % or less, further preferably 10 mass, or less, furthermore preferably 5 mass % or less, furthermore preferably 2.5 mass % or less, furthermore preferably 1 mass % or less and furthermore preferably 0.1 mass % or less from the viewpoint of formulation recoverability.

Examples of the disinfectants include, for example, those described in paragraph [0043] of WO-A 2012/029893 or the like. Examples of the insecticides include, for example, those described in paragraphs [0044] to [0045] of WO-A 2012/029893 or the like. Examples of the miticides include, for example, those described in paragraph [0046] of WO-A 2012/029893 or the like. Examples of the herbicides include, for example, those described in paragraph [0047] of WO-A 2012/029893 or the like.

The total content of components (A) and (B) in the disinfectant composition for plants of the present invention is preferably 20 mass % or more, more preferably 30 mass % or more, further preferably 40 mass % or more, furthermore preferably 50 mass % or more, furthermore preferably 60 mass % or more, furthermore preferably 70 mass % or more, furthermore preferably 80 mass % or more, furthermore preferably 90 mass % or more and furthermore preferably 95 mass % or more, and preferably 100 mass % or less from the viewpoint of formulation recoverability.

When the disinfectant composition for plants of the present invention contains component (C), the total content of components (A), (B) and (C) is preferably 30 mass or more, more preferably 40 mass % or more, further preferably 50 mass % or more, furthermore preferably 50 mass % or more, furthermore preferably 60 mass % or more, furthermore preferably 70 mass % or more, furthermore preferably 80 mass % or more, furthermore preferably 90 mass % or more and furthermore preferably 95 mass % or more, and preferably 100 mass % or less from the viewpoint of formulation recoverability.

The disinfectant composition for plants of the present invention may contain, for example, an antioxidant, an antiseptic, an accidental ingestion inhibitor, a colorant, a thickener, a bulking agent, a stabilizer, an emulsifier, a nutrient, a pigment, a fragrance, a plant growth regulator, a fertilizer and the like within a range that the effects of the present invention are not impaired.

Examples of the plant growth regulator include, for example, those described in paragraph [0049] of WO-A 2012/029893 or the like.

[Disinfectant Treatment Liquid for Plants]

The present invention relates to a disinfectant treatment liquid for plants containing component (A), component (B) and water, wherein a mass ratio between the content of component (A) and the content of component (B), (B)/(A), is 0.05 more and 0.9 or less.

The disinfectant treatment liquid for plants of the present invention may be prepared by mixing the disinfectant composition for plants of the present invention with water.

The aspects of components (A) and (B) in the disinfectant treatment liquid for plants of the present invention are the same as those stated in the disinfectant composition for plants of the present invention.

The disinfectant treatment liquid for plants of the present invention may further contain component (C). The aspects of component (C) in the disinfectant treatment liquid for plants of the present invention are the same as those stated in the disinfectant composition for plants of the present invention.

The aspects stated in the disinfectant composition for plants of the present invention can be appropriately applied to the disinfectant treatment liquid for plants of the present invention.

The content of component (A) in the disinfectant treatment liquid for plants of the present invention is preferably 20 ppm or more, more preferably 50 ppm or more, further preferably 100 ppm or more and furthermore preferably 200 ppm or more, and preferably 2000 ppm or less, more preferably 1200 ppm or less and further preferably 900 ppm or less from the viewpoints of disinfection effects and phytotoxicity.

The content of component (B) in the disinfectant treatment liquid for plants of the present invention is preferably 10 ppm or more, more preferably 20 ppm or more and further preferably 50 ppm or more, and preferably 1000 ppm or less, more preferably 500 ppm or less and further preferably 300 ppm or less from the viewpoints of disinfection effects and phytotoxicity.

The total content of components (A) and (B) in the disinfectant treatment liquid for plants of the present invention is preferably 30 ppm or more, more preferably 50 ppm or more, further preferably 100 ppm or more, furthermore preferably 200 ppm or more and furthermore preferably 250 ppm or more, and preferably 2000 ppm or less, more preferably 1200 ppm or less and further preferably 900 ppm or less from the viewpoints of disinfection effects and phytotoxicity.

The mass ratio between the content of component (A) and the content of component (B) in the disinfectant treatment liquid for plants of the present invention, (B)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects and phytotoxicity.

When component (A) includes decanol (hereinafter referred to as component (A1)), the mass ratio between the content of component (A1) and the content of component (B) in the disinfectant treatment liquid for plants of the present invention, (B)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects and phytotoxicity.

When component (B) includes a polyoxyethylene sorbitan oleic acid monoester (hereinafter referred to as component (B1)), the mass ratio between the content of component (A) and the content of component (B1) in the disinfectant treatment liquid for plants of the present invention, (B1)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects and phytotoxicity.

When components (A) and (B) include components (A1) and (B1), respectively, the mass ratio between the content of component (A1) and the content of component (B1) in the disinfectant treatment liquid for plants of the present invention, (B1)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less from the viewpoints of disinfection effects and phytotoxicity.

When the disinfectant treatment liquid for plants of the present invention contains component (C), the content of component (C) is preferably 10 ppm or more, more preferably 40 ppm or more, further preferably 80 ppm or more and furthermore preferably 150 ppm or more, and preferably 1500 ppm or less, more preferably 1000 ppm or less, further preferably 700 ppm or less, furthermore preferably 500 ppm or less and furthermore preferably 300 ppm or less from the viewpoints of disinfection effects and phytotoxicity.

The disinfectant treatment liquid for plants of the present invention is preferably substantially free of any agrochemical active ingredient selected from respective active ingredients of disinfectants, insecticides, miticides and herbicides, and more preferably substantially free of especially an agrochemical active ingredient in which a disinfectant other than component (A) is used as an active ingredient from the viewpoints of the environment and safety.

In other words, the present invention provides a disinfectant treatment liquid for plants composed of, essentially component (A), component (B), optionally component (C), and water.

Here, the term "essentially" in the context of the disinfectant treatment liquid for plants of the present invention means that the treatment liquid may contain a component other than components (A), (B) and (C) and water in a range that the action or effects of the present invention are not affected, but it does not contain a component that the action or effects of the present invention are affected, for example, an agrochemical active ingredient in which a disinfectant other than components (A) and (B) is used as an active ingredient.

The aspects of the agrochemical active ingredient are the same as those stated in the disinfectant composition for plants of the present invention.

The content of any agrochemical active ingredient selected from respective active ingredients of disinfectants, insecticides, miticides and herbicides in the disinfectant treatment liquid for plants of the present invention is preferably 1000 ppm or less, more preferably 500 ppm or less, further preferably 100 ppm or less, furthermore preferably 50 ppm or less, furthermore preferably 25 ppm or less, furthermore preferably 10 ppm or less, furthermore preferably 5 ppm or less and furthermore preferably 1 ppm or less from the viewpoints of disinfection effects and phytotoxicity.

The content of the agrochemical active ingredient in which a disinfectant other than component (A) is used as an active ingredient in the disinfectant treatment liquid for plants of the present invention is preferably 1000 ppm or less, more preferably 500 ppm or less, further preferably 100 ppm or less, furthermore preferably 25 ppm or less, furthermore preferably 50 ppm or less, furthermore preferably 10 ppm or less, furthermore preferably 5 ppm or less and furthermore preferably 1 ppm or less from the viewpoints of disinfection effects and phytotoxicity.

The proportion of components (A) and (B) in components other than water in the disinfectant treatment liquid for plants of the present invention is preferably 20 mass % or more, more preferably 30 mass % or more, further preferably 40 mass or more, furthermore preferably 50 mass % or more, furthermore preferably 60 mass % or more, furthermore preferably 70 mass % or more, furthermore preferably 80 mass % or more, furthermore preferably 90 mass % or more and furthermore preferably 95 mass % or more, and preferably 100 mass % or less from the viewpoints of disinfection effects and phytotoxicity.

When the disinfectant treatment liquid for plants of the present invention contains component (C), the proportion of components (A), (B) and (C) in components other than water in the treatment liquid is preferably 30 mass % or more, more preferably 40 mass % or more, further preferably 50 mass % or more, furthermore preferably 60 mass % or more, furthermore preferably 70 mass % or more, furthermore preferably 80 mass % or more, furthermore preferably 90 mass % or more and furthermore preferably 95 mass % or more, and preferably 100 mass % or less from the viewpoints of disinfection effects and phytotoxicity.

The disinfectant treatment liquid for plants of the present invention may contain, for example, an antioxidant, an antiseptic, an accidental ingestion inhibitor, a colorant, a thickener, a bulking agent, a stabilizer, an emulsifier, a nutrient, a pigment, a fragrance, a plant growth regulator, a fertilizer and the like within a range that the effects of the present invention are not impaired.

[Method for Disinfecting Plant]

The present invention relates to a method for disinfecting a plant including a step of applying to the plant the disinfectant treatment liquid for plants of the present invention.

In other words, the present invention relates to a method for disinfecting a plant including a step of applying to the plant a disinfectant treatment liquid for plants, the disinfectant treatment liquid containing component (A), component (B) and water, wherein a mass ratio between the content of component (A) and the content of component (B), (B)/(A), is 0.05 or more and 0.9 or less.

Further, the present invention relates to a method for disinfecting a plant including a step of applying to the plant a disinfectant treatment liquid for plants, the disinfectant treatment liquid being composed of, essentially component (A), component (B), optionally (C) a solvent, and water, wherein a mass ratio between the content of component (A) and the content of component (B), (B)/(A), is 0.05 or more and 0.9 or less.

The aspects stated in the disinfectant composition for plants of the present invention and the disinfectant treatment liquid for plants of the present invention can be appropriately applied to the method for disinfecting a plant of the present invention.

Examples of the step of applying to the plant the disinfectant treatment liquid for plants of the present invention include, for example, (1) a step of spraying the treatment liquid to the plant, for example, a leaf surface, a stem or a fruit of the plant, by a handheld sprayer, a boom sprayer, aerial spraying or the like, (2) a step of directly coating the plant, for example, a leaf, a stem or a fruit, with the treatment liquid, (3) a step of irrigating soil with the treatment liquid through a liquid fertilizer feeder or the like to apply to a root of the plant, (4) a step of applying the treatment liquid to a root as a hydroponic liquid in hydroponics, or the like. A step of spraying the treatment liquid to the plant as in (1) is preferable.

The disinfectant treatment liquid for plants of the present invention can be sprayed at a rate of preferably 3 liters per 10 ares or more, more preferably 5 liters per 10 ares or more, more preferably 7 liters per 10 ares or more, further preferably 10 liters per 10 ares or more, further preferably 20 liters per 10 ares or more, further preferably 30 liters per 10 ares or more and further preferably 40 liters per 10 ares or more from the viewpoint of enhancing disinfection effects, and preferably 300 liters per 10 ares or less, more preferably 250 liters per 10 ares or less, more preferably 200 liters per 10 ares or less, more preferably 150 liters per 10 ares or less and further preferably 120 liters per 10 ares or less from the viewpoints of enhancing disinfection effects and economy.

Examples of the plant to which the method for disinfecting a plant of the present invention is directed include plants cultivated as agricultural crops. Specific examples include fruit vegetables such as cucumber, pumpkin, watermelon, melon, tomato, eggplant, green pepper, strawberry, okura, string bean, broad bean, pea, green soybean, corn or the like, leaf vegetables such as Chinese cabbage, greens to be pickled, qing-geng-cai, cabbage, cauliflower, broccoli, Brussels sprout, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur, beefsteak plant or the like, and root vegetables such as daikon radish, turnip, burdock, carrot, potato, taro, sweet potato, yam, ginger, lotus root or the like. In addition, it can also be used for rice plants, wheat plants, flowering plants or the like. Further, it can also be used for oil palm plants such as American oil palm, Guinea oil palm or the like, and palmae plants such as coconut palm or the like.

The method for disinfecting a plant of the present invention is preferably used for killing one or more fungi selected from:

pathogenic filamentous fungi that cause plant diseases selected from leaf rot, brown spot disease in rice, damping-off of vegetables, anthracnose of cucumber, cabbage black leaf spot, bakanae disease of rice, apple scab, anthracnose of apple, apple canker, apple brown rot, gummy stem blight of melon, powdery mildew infectious to various plants, aster yellows of daikon radish, onion neck rot, black spot disease of pear, *Cercospora* leaf spot of sugar beet and the like;

pathogenic chemical pesticide-resistant fungi (filamentous fungi) that cause plant diseases selected from *Alternaria* blotch of apple, gray mold of Japanese persimmon, frogeye spot on green pepper, gray mold of tomato, eyespot of wheat and the like;

pathogenic bacteria that cause plant diseases selected from bacterial soft rot on qing-geng-cai, bacterial soft rot on taro, peach shot hole disease and the like; and mushrooms selected from *Ganoderma*, Oouzuratake, Ookawaratake, Kawaratake and the like.

In the method for disinfecting a plant of the present invention, the disinfectant treatment liquid for plants of the present invention is preferably applied to the plant during cultivating. Further, the treatment liquid is preferably foliar sprayed to the plant during cultivating.

The present invention further discloses the following method for disinfecting a plant in connection with the above embodiments.

<1>

A method for disinfecting a plant including a step of applying to the plant a disinfectant treatment liquid for plants, the disinfectant treatment liquid containing, (A) a straight-chain aliphatic alcohol with 8 or more and 12 or less carbons as a disinfectant component (hereinafter referred to as component (A)) and (B) a polyoxyalkylene sorbitan fatty acid ester (hereinafter referred to as component (B)), wherein a mass ratio between the content of component (A) and the content of component (B), (B)/(A), is 0.05 or more and 0.9 or less.

<2>

The method for disinfecting a plant according to <1>, wherein component (A) is a compound represented by the following general formula (A1):

$$R^{1a}\text{---OH} \tag{A1}$$

wherein $R^{1a}$ is a straight-chain alkyl group with 8 or more and 12 or less carbons or a straight-chain alkenyl group with 8 or more and 12 or less carbons.

<3>

The method for disinfecting a plant according to <1> or <2>, wherein component (A) is one or more selected from octanol, decanol and dodecanol, preferably one or more selected from octanol and decanol, and more preferably decanol.

<4>

The method for disinfecting a plant according to any of <1> to <3>, wherein component (A) includes decanol, and the content of decanol in component (A) is preferably 50 mol % or more, more preferably 80 mol % or more, further preferably 90 mol % or more and furthermore preferably 99 mol % or more, and 100 mol % or less.

<5>

The method for disinfecting a plant according to any of <1> to <4>, wherein component (B) is a polyoxyalkylene sorbitan fatty acid monoester in which the fatty acid has 8 or more, preferably 10 or more, more preferably 12 or more, further preferably 14 or more and furthermore preferably 16 or more, and 24 or less, preferably 20 or less, more preferably 18 or less and further preferably 18 carbons, and the average number of added moles of the alkylene oxide is 5 or more, preferably 10 or more and more preferably 15 or more, and 100 or less, preferably 60 or less, more preferably 40 or less, further preferably 30 or less and furthermore preferably 25 or less.

<6>

The method for disinfecting a plant according to any of <1> to <5>, wherein component (B) is a polyoxyethylene sorbitan fatty acid monoester in which the fatty acid has 8 or more, preferably 10 or more, more preferably 12 or more, further preferably 14 or more and furthermore preferably 16 or more, and 24 or less, preferably 20 or less, more preferably 18 or less and further preferably 18 carbons, and the average number of added moles of the ethylene oxide is 5 or more, preferably 10 or more and more preferably 15 or more, and 100 or less, preferably 60 or less, more preferably 40 or less, further preferably 30 or less and furthermore preferably 25 or less.

<7>

The method for disinfecting a plant according to any of <1> to <6>, wherein a mass ratio between the content of component (A) and the content of component (B) in the disinfectant treatment liquid for plants, (B)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less.

<8>

The method for disinfecting a plant according to any of <1> to <7>, wherein in the disinfectant treatment liquid for plants, component (A) includes decanol (hereinafter referred to as component (A1)), and a mass ratio between the content of component (A1) and the content of component (B), (B)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less.

<9>

The method for disinfecting a plant according to any of <1> to <8>, wherein in the disinfectant treatment liquid for plants, component (B) includes a polyoxyethylene sorbitan oleic acid monoester (hereinafter referred to as component (B1)), and a mass ratio between the content of component (A) and the content of component (B1), (B1)/(A), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less.

<10>

The method for disinfecting a plant according to <8> or <9>, wherein in the disinfectant treatment liquid for plants, components (A) and (B) include components (A1) and (B1), respectively, and a mass ratio between the content of component (A1) and the content of component (B1), (B1)/(A1), is 0.05 or more, preferably 0.1 or more and more preferably 0.2 or more, and 0.9 or less, preferably 0.8 or less, more preferably 0.7 or less, further preferably 0.6 or less, furthermore preferably 0.5 or less and furthermore preferably 0.4 or less.

<11>

The method for disinfecting a plant according to any of <1> to <10>, wherein the content of component (A) in the disinfectant treatment liquid for plants is preferably 20 ppm or more, more preferably 50 ppm or more, further preferably 100 ppm or more and furthermore preferably 200 ppm or more, and preferably 2000 ppm or less, more preferably 1200 ppm or less and further preferably 900 ppm or less.

<12>

The method for disinfecting a plant according to any of <1> to <11>, wherein the content of component (B) in the disinfectant treatment liquid for plants is preferably 10 ppm or more, more preferably 20 ppm or more and further preferably 50 ppm or more, and preferably 1000 ppm or less, more preferably 500 ppm or less and further preferably 300 ppm or less.

<13>

The method for disinfecting a plant according to any of <1> to <12>, wherein a total content of components (A) and (B) in the disinfectant treatment liquid for plants is preferably 30 ppm or more, more preferably 50 ppm or more, further preferably 100 ppm or more, furthermore preferably 200 ppm or more and furthermore preferably 250 ppm or more, and preferably 2000 ppm or less, more preferably 1200 ppm or less and further preferably 900 ppm or less.

<14>

The method for disinfecting a plant according to <1> to <13>, wherein a proportion of components (A) and (B) in components other than water in the disinfectant treatment liquid for plants is preferably 20 mass % or more, more preferably 30 mass % or more, further preferably 40 mass, or more, furthermore preferably 50 mass or more, furthermore preferably 60 mass % or more, furthermore preferably 70 mass, or more, furthermore preferably 80 mass % or more, furthermore preferably 90 mass % or more and furthermore preferably 95 mass % or more, and preferably 100 mass % or less.

<15>

The method for disinfecting a plant according to any of <1> to <14>, wherein the disinfectant treatment liquid for plants further contains (C) a solvent (hereinafter referred to as component (C)).

<16>

The method for disinfecting a plant according to <15>, wherein component (C) is one or more selected from propylene glycol, butanol, 2-ethylhexanol, benzyl alcohol, ethyl lactate, propanol, ethylene glycol, diethylene glycol, propylene glycol, glycerin, ethyl acetate, methanol, ethanol, butyl acetate, methyl lactate and butyl lactate, preferably one or more selected from propylene glycol, butanol, 2-ethylhexanol, benzyl alcohol, ethyl lactate, propanol, ethylene glycol, diethylene glycol, propylene glycol and glycerin, and more preferably one or more selected from propylene glycol, butanol, 2-ethylhexanol, benzyl alcohol and ethyl lactate.

<17>

The method for disinfecting a plant according to <15> or <16>, wherein the content of component (C) in the disinfectant treatment liquid for plants is preferably 10 ppm or more, more preferably 40 ppm or more, further preferably 80 ppm or more and furthermore preferably 150 ppm or more, and preferably 1500 ppm or less, more preferably 1000 ppm or less, further preferably 700 ppm or less, furthermore preferably 500 ppm or less and furthermore preferably 300 ppm or less.

<18>

The method for disinfecting a plant according to any of <1> to <17>, wherein the content of any agrochemical active ingredient selected from respective active ingredients of disinfectants, insecticides, miticides and herbicides in the disinfectant treatment liquid for plants is preferably 1000 ppm or less, more preferably 500 ppm or less, further preferably 100 ppm or less, furthermore preferably 50 ppm or less, furthermore preferably 25 ppm or less, furthermore preferably 10 ppm or less, furthermore preferably 5 ppm or less and furthermore preferably 1 ppm or less.

<19>

The method for disinfecting a plant according to any of <15> to <18>, wherein a proportion of components (A), (B) and (C) in components other than water in the disinfectant treatment liquid for plants is preferably 30 mass or more, more preferably 40 mass % or more, further preferably 50 mass % or more, furthermore preferably 60 mass % or more, furthermore preferably 70 mass % or more, furthermore preferably 80 mass % or more, furthermore preferably 90 mass % or more and furthermore preferably 95 mass % or more, and preferably 100 mass % or less.

<20>

The method for disinfecting a plant according to any of <1> to <19>, wherein the step of applying to the plant the disinfectant treatment liquid for plants is any of:

(1) a step of spraying the treatment liquid to the plant, preferably a leaf surface, a stem or a fruit of the plant, by a handheld sprayer, a boom sprayer or aerial spraying;

(2) a step of directly coating the plant, preferably a leaf, a stem or a fruit, with the treatment liquid;

(3) a step of irrigating soil with the treatment liquid through a liquid fertilizer feeder to apply to a root of the plant; or (4) a step of applying the treatment liquid to a root as a hydroponic liquid in hydroponics, and the step is preferably step (1).

<21>

The method for disinfecting a plant according to any of <1> to <20>, wherein the disinfectant treatment liquid for plants is sprayed at a rate of preferably 3 liters per 10 ares or more, more preferably 5 liters per 10 ares or more, more preferably 7 liters per 10 ares or more, further preferably 10 liters per 10 ares or more, further preferably 20 liters per 10 ares or more, further preferably 30 liters per 10 ares or more and further preferably 40 liters per 10 ares or more, and preferably 300 liters per 10 ares or less, more preferably 250 liters per 10 ares or less, more preferably 200 liters per 10 ares or less, more preferably 150 liters per 10 ares or less and further preferably 120 liters per 10 ares or less.

<22>

The method for disinfecting a plant according to any of <1> to <21>, wherein the target plant is one or more selected from:

one or more fruit vegetables selected from cucumber, pumpkin, watermelon, melon, tomato, eggplant, green pepper, strawberry, okura, string bean, broad bean, pea, green soybean and corn;

one or more leaf vegetables selected from Chinese cabbage, greens to be pickled, qing-geng-cai, cabbage, cauliflower, broccoli, Brussels sprout, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur and beefsteak plant;

one or more root vegetables selected from daikon radish, turnip, burdock, carrot, potato, taro, sweet potato, yam, ginger and lotus root;

one or more flowering plants selected from rice plants and wheat plants;

one or more oil palm plants selected from American oil palm and Guinea oil palm; and palmae plants.

<23>

The method for disinfecting a plant according to any of <1> to <22>, wherein the method is used for killing one or more fungi selected from:

pathogenic filamentous fungi that cause plant diseases selected from brown spot disease in rice, damping-off of vegetables, anthracnose of cucumber, cabbage black leaf spot, bakanae disease of rice, anthracnose of apple, apple canker, apple brown rot, gummy stem blight of melon, aster yellows of daikon radish, onion neck rot, black spot disease of pear and *Cercospora* leaf spot of sugar beet;

pathogenic chemical pesticide-resistant fungi (filamentous fungi) that cause plant diseases selected from *Alternaria* blotch of apple, frogeye spot on green pepper, gray mold of tomato and eyespot of wheat;

pathogenic bacteria that cause plant diseases selected from bacterial soft rot on qing-geng-cai, bacterial soft rot on taro and peach shot hole disease; and mushrooms selected from *Ganoderma*, Oouzuratake and Kawaratake.

<24>

The method for disinfecting a plant according to any of <1> to <23>, wherein the disinfectant treatment liquid for plants is applied to the plant during cultivating, and the treatment liquid is preferably foliar sprayed to the plant during cultivating.

EXAMPLES

[Preparation of Disinfectant Composition for Plants]

The disinfectant compositions for plants shown in Table 1 were prepared by using the following formulation components.

The disinfectant compositions for plants in Table 1 were prepared in the following manner. Components (A), (B) and (C) were weighed to give predetermined concentrations, and thereafter mixed at 50° C. for 1 hour at a revolution rate of 100 rpm and then cooled to a room temperature, thereby obtaining the disinfectant compositions for plants. Note that the mass percentages of the formulation components in Table 1 are all numerical values based on active ingredients. Further, in Table 1, components (A') and (B') are shown respectively in the columns of components (A) and (B) for convenience.

<Formulation Component>

Component (A)

A1: decanol, KALCOL 1098, manufactured by Kao Corporation

A2: octanol, KALCOL 0898, manufactured by Kao Corporation

A3: dodecanol, KALCOL 2098, manufactured by Kao Corporation

Component (A') (Comparative Component of Component (A))

A'1: 1-hexanol, manufactured by FUJIFILM Wako Pure Chemical Corporation

A'2: myristyl alcohol, KALCOL 4098, manufactured by Kao Corporation

Component (B)

B1: polyoxyethylene (6) sorbitan monolaurate, shown in parentheses is the average number of added moles of the ethylene oxide, the same applies hereinafter B2: polyoxyethylene (6) sorbitan monopalmitate B3: polyoxyethylene (6) sorbitan monostearate B4: polyoxyethylene (6) sorbitan monooleate B5: polyoxyethylene (20) sorbitan monolaurate B6: polyoxyethylene (20) sorbitan monopalmitate B7: polyoxyethylene (20) sorbitan monostearate B8: polyoxyethylene (20) sorbitan monooleate Component (B') (Comparative Component of Component (B))

B'1: sorbitan monolaurate

B'2: sorbitan monopalmitate

B'3: sorbitan monostearate

B'4: sorbitan monooleate

B'5: polyethylene glycol (12) monolaurate

Component (C)

C1: propylene glycol, manufactured by FUJIFILM Wako Pure Chemical Corporation

C2: butanol, manufactured by FUJIFILM Wako Pure Chemical Corporation

C3: 2-ethylhexanol, manufactured by FUJIFILM Wako Pure Chemical Corporation

C4: benzyl alcohol, manufactured by FUJIFILM Wako Pure Chemical Corporation

C5: ethyl lactate, manufactured by FUJIFILM Wako Pure Chemical Corporation

[Formulation Recoverability Test]

Each disinfectant composition for plants shown in Table 1 was stored at −16° C. for 3 days after prepared, thereby solidifying each disinfectant composition for plants. After solidified, it was stored at 5° C. for 1 hour to evaluate recoverability of the formulation solidified at a low temperature to a solution. The appearance of a state of the formulation recovered from solidification to a solution was visually observed and judged according to the following judgement criteria. The results are shown in Table 1. In the present evaluation, the states judged to be "Excellent," "Good" and "Average to good" are preferable, and the states judged to be "Average" and "Poor" are not preferable.

Excellent: a transparent liquid

Good: a white cloudy but uniform liquid

Average to good: a white cloudy liquid that is visually slightly separated into the upper layer and the lower layer, but becomes uniform if shaken lightly Average: a white cloudy liquid that is visually separated into the upper layer and the lower layer, and does not become uniform even if shaken lightly Poor: a state of remaining solidified ingredients. Further, in Table 2, components (A') and (B') are shown respectively in the columns of components (A) and (B) for convenience.

[Disinfection Ability Test]

Each prepared disinfectant treatment liquid for plants shown in Table 2 was added to a potato dextrose agar culture medium (PDA culture medium) during preparation of the medium to prepare a disinfectant-containing PDA culture medium. (1) *Alternaria* blotch of apple (*Alternaria mali*, a $Q_o$ inhibitor-resistant fungus) as a filamentous fungus, (2) bacterial soft rot on qing-geng-cai (*Erwinia carotovora*) as a bacterium and (3) *Ganoderma* (*Ganoderma applanatum*) as a mushroom were cultured in advance on separate PDA culture media, and an amount of one inoculation loop was scratched from each microbiota and applied to the disinfec-

TABLE 1

| | | Disinfectant composition for plants | | | | | | |
|---|---|---|---|---|---|---|---|---|
| | | Component (A) | | Component (B) | | Component (C) | | Mass |
| | | Type | Content (mass %) | Type | Content (mass %) | Type | Content (mass %) | ratio (B)/(A) | Formulation recoverability |
| Example | 1-1 | A1 | 80.0 | B1 | 20.0 | — | — | 0.25 | Good |
| | 1-2 | | | B2 | | | | | Good |
| | 1-3 | | | B3 | | | | | Good |
| | 1-4 | | | B4 | | | | | Good |
| | 1-5 | | | B5 | | | | | Good |
| | 1-6 | | | B6 | | | | | Good |
| | 1-7 | | | B7 | | | | | Good |
| | 1-8 | | | B8 | | | | | Good |
| | 1-9 | A2 | | | | | | | Good |
| | 1-10 | A3 | | | | | | | Average to good |
| | 1-11 | A1 | 90.0 | | 10.0 | | | 0.11 | Good |
| | 1-12 | | 64.0 | | 36.0 | | | 0.56 | Average to good |
| | 1-13 | | 89.9 | | 10.1 | | | 0.11 | Good |
| | 1-14 | | 64.4 | | 35.6 | | | 0.55 | Average to good |
| | 1-15 | | 80.0 | | 20.0 | | | 0.25 | Good |
| | 1-16 | | 71.4 | | 28.6 | | | 0.40 | Good |
| | 1-17 | | 44.7 | | 17.9 | C1 | 37.4 | 0.40 | Excellent |
| | 1-18 | | | | | C2 | | | Excellent |
| | 1-19 | | | | | C3 | | | Excellent |
| | 1-20 | | | | | C4 | | | Excellent |
| | 1-21 | | | | | C5 | | | Excellent |
| | 1-22 | | 92.8 | | 7.2 | — | — | 0.08 | Average to good |
| | 1-23 | | 54.4 | | 45.6 | — | — | 0.84 | Average to good |
| Comparative example | 1-1 | A1 | 80.0 | B'1 | 20.0 | — | — | 0.25 | Poor |
| | 1-2 | | | B'2 | | | | | Poor |
| | 1-3 | | | B'3 | | | | | Poor |
| | 1-4 | | | B'4 | | | | | Poor |
| | 1-5 | | 50.0 | B8 | 50.0 | | | 1.00 | Average |
| | 1-6 | | 80.0 | B'5 | 20.0 | | | 0.25 | Poor |
| | 1-7 | | 100.0 | — | — | | | — | Poor |
| | 1-8 | A'1 | 80.0 | B8 | 20.0 | | | 0.25 | Average |
| | 1-9 | A'2 | 80.0 | | 20.0 | | | 0.25 | Poor |
| | 1-10 | A1 | 96.0 | | 4.0 | | | 0.04 | Poor |

[Preparation of Disinfectant Treatment Liquid for Plants]

The disinfectant treatment liquids for plants shown in Table 2 were prepared by using the above formulation components.

The disinfectant treatment liquids for plants in Table 2 were prepared in the following manner. The disinfectant compositions for plants prepared in Table 1 were weighed to give predetermined concentrations, and a predetermined amount of tap water was thereafter added and mixed at a room temperature for 10 minutes at a revolution rate of 100 rpm, thereby obtaining the disinfectant treatment liquids for plants in Table 2.

Note that the contents (ppm) of the formulation components in Table 2 are all numerical values based on active tant-containing PDA culture medium prepared above, and cultured at 23° C. under a relative humidity of 60% for 7 days. After that, the proportion of the area of a portion in which the microbiota was grown on the disinfectant-containing PDA culture medium to the area of the entire petri dish was visually observed by appearances and judged according to the following criteria to evaluate disinfection performance. The results are shown in Table 2. As shown in Table 2, it was confirmed that the disinfectant treatment liquid for plants of the present invention exhibits more excellent disinfectant ability against (1) a filamentous fungus (*Alternaria* blotch of apple ($Q_o$ inhibitor-resistant)), (2) a bacterium (bacterial soft rot on qing-geng-cai) and (3) a mushroom (*Ganoderma*) than the treatment liquids of the comparative examples.

+++: not grown (grown in an area of 0%)
++: grown slightly (a visually observable level to less than 5%)
+: grown in an area of 5% or more and less than 30%
±: grown in an area of 30% or more and less than 60%
−: grown in an area of 60% or more and 100%

[Plant Phytotoxicity Test]

A soybean (variety: Fukuyutaka) was cultivated in a 9 cm pot for 3 weeks to prepare a young seedling at the second leaf stage. Each prepared disinfectant treatment liquid for plants shown in Table 2 was sprayed to the young soybean seedling at a spray solution rate of 100 liters per 10 ares three times every three days. One week after the spraying, phytotoxic effects occurring on the seed leaf and the first leaf were visually observed and judged according to the following criteria. The results are shown in Table 2. As shown in Table 2, it was confirmed that the disinfectant treatment liquid for plants of the present invention does not cause phytotoxic effects on the young soybean seedling and is highly safe for plants.

A: no phytotoxic effects occurred at all as shown in FIG. 1 (A)
B: slight phytotoxic effects occurred as shown in FIG. 1 (B)
C: strong phytotoxic effects occurred as shown in FIG. 1 (C)
D: Extremely strong phytotoxic effects occurred as shown in FIG. 1 (D)

TABLE 2

|  |  | Disinfectant treatment liquid for plants | | | | | | | Disinfection ability test | | | |
|  |  | Component (A) | | Component (B) | | Component (C) | | Mass ratio (B)/(A) | Content of (A) + (B) (ppm) | (1) Alternaria blotch of apple (Q$_o$ inhibitor-resistant) | (2) Bacterial soft rot on qing-geng-cai | (3) Ganoderma | Plant phytotoxicity test |
|  |  | Type | Content (ppm) | Type | Content (ppm) | Type | Content (ppm) | | | | | | |
| Example | 2-1 | A1 | 500 | B1 | 125 | — | — | 0.25 | 625 | ++ | ++ | + | A |
|  | 2-2 |  |  | B2 |  |  |  |  |  | ++ | + | + | A |
|  | 2-3 |  |  | B3 |  |  |  |  |  | ++ | + | + | A |
|  | 2-4 |  |  | B4 |  |  |  |  |  | ++ | ++ | ++ | A |
|  | 2-5 |  |  | B5 |  |  |  |  |  | +++ | +++ | ++ | A |
|  | 2-6 |  |  | B6 |  |  |  |  |  | +++ | ++ | + | A |
|  | 2-7 |  |  | B7 |  |  |  |  |  | +++ | ++ | + | A |
|  | 2-8 |  |  | B8 |  |  |  |  |  | +++ | +++ | +++ | A |
|  | 2-9 | A2 |  |  |  |  |  |  |  | ++ | ++ | + | A |
|  | 2-10 | A3 |  |  |  |  |  |  |  | ++ | + | + | A |
|  | 2-11 | A1 | 562.5 |  | 62.5 |  |  | 0.11 | 625 | ++ | ++ | ++ | A |
|  | 2-12 |  | 400 |  | 225 |  |  | 0.56 | 625 | ++ | ++ | + | A |
|  | 2-13 |  | 500 |  | 56 |  |  | 0.11 | 556 | ++ | + | ++ | A |
|  | 2-14 |  |  |  | 277 |  |  | 0.55 | 777 | +++ | + | ++ | A |
|  | 2-15 |  | 720 |  | 180 |  |  | 0.25 | 900 | +++ | ++ | ++ | A |
|  | 2-16 |  | 80 |  | 20 |  |  | 0.25 | 100 | + | + | + | A |
|  | 2-17 |  | 200 |  | 80 |  |  | 0.40 | 280 | ++ | ++ | ++ | A |
|  | 2-18 |  |  |  |  | C1 | 167 |  |  | +++ | +++ | +++ | A |
|  | 2-19 |  |  |  |  | C2 |  |  |  | +++ | +++ | +++ | A |
|  | 2-20 |  |  |  |  | C3 |  |  |  | +++ | +++ | +++ | A |
|  | 2-21 |  |  |  |  | C4 |  |  |  | +++ | +++ | +++ | A |
|  | 2-22 |  |  |  |  | C5 |  |  |  | +++ | +++ | +++ | A |
|  | 2-23 |  | 580 |  | 45 | — | — | 0.08 | 625 | ++ | + | + | A |
|  | 2-24 |  | 340 |  | 285 | — | — | 0.84 | 625 | + | + | + | A |
| Comparative example | 2-1 | A1 | 500 | B'1 | 125 | — | — | 0.25 | 625 | − | ± | ± | A |
|  | 2-2 |  |  | B'2 |  |  |  |  |  | − | ± | − | A |
|  | 2-3 |  |  | B'3 |  |  |  |  |  | − | ± | − | A |
|  | 2-4 |  |  | B'4 |  |  |  |  |  | − | ± | ± | A |
|  | 2-5 |  | 312.5 | B8 | 312.5 |  |  | 1.00 | 625 | ± | ± | ± | B |
|  | 2-6 |  | 500 |  | 500 |  |  | 1.00 | 1000 | ± | ± | ± | C |
|  | 2-7 |  |  | B'5 | 125 |  |  | 0.25 | 125 | ± | ± | ± | A |
|  | 2-8 |  | 625 | — | — |  |  | — | 625 | ± | ± | ± | D |
|  | 2-9 |  | 500 |  |  |  |  |  | 500 | ± | ± | ± | C |
|  | 2-10 |  | 200 |  |  |  |  |  | 200 | ± | − | − | B |
|  | 2-11 | A'1 | 500 | B8 | 125 |  |  | 0.25 | 625 | − | − | − | A |
|  | 2-12 | A'2 | 500 |  | 125 |  |  | 0.25 | 625 | − | − | − | A |
|  | 2-13 | A1 | 600 |  | 25 |  |  | 0.04 | 625 | ± | ± | ± | C |

[Disinfection Spectrum Test]

Components (A), (B) or (B') and water (remaining proportion) were mixed in formulation amounts shown in Table 3 to prepare disinfectant treatment liquids for plants. In comparative example 3-1, the commercial chemical pesticide disinfectant Daconil 1000 (tetrachloroisophthalonitrile, manufactured by SUMITOMO CHEMICAL COMPANY, LIMITED) was mixed in the formulation amount shown in Table 3 with water (remaining proportion) to prepare the disinfectant treatment liquid for plants.

The 13 types of filamentous fungi, 3 types of chemical pesticide-resistant filamentous fungi, 2 types of bacteria and 2 types of mushrooms shown in Table 3 were cultured in advance on PDA culture media. As in the above disinfection ability test, each disinfectant treatment liquid for plants shown in Table 3 was added to a PDA culture medium during preparation of the medium to prepare a disinfectant-containing PDA culture medium. An amount of one inoculation loop was scratched from each type of microbiota cultured in advance and applied to the disinfectant-containing PDA culture medium, and cultured at 23° C. under a relative humidity of 60% for 7 days. Evaluations were made in the same manner as in the above disinfection ability test. The results are shown in Table 3.

As shown in Table 3, it was confirmed that the disinfectant treatment liquid for plants of the present invention exhibits more excellent disinfection performance against various types of fungi (filamentous fungi, chemical pesticide-resistant filamentous fungi, bacteria and mushrooms) than the disinfectant treatment liquids for plants of the comparative examples and has a wide disinfection spectrum.

component, component (B), which is a polyoxyalkylene sorbitan fatty acid ester, and water, wherein a mass ratio between the component (A) and the component (B), (B)/(A), is 0.08 or more and 0.84 or less.

2. The method according to claim 1, wherein the disinfectant treatment liquid further comprises a solvent as component (C).

3. A method for disinfecting a plant, the method comprising applying to the plant a disinfectant treatment liquid, the disinfectant treatment liquid consisting essentially of, component (A), which is a straight-chain aliphatic alcohol with 8 or more and 12 or less carbons as a disinfectant component, component (B), which is a polyoxyalkylene sorbitan fatty acid ester, optionally component (C), which is a solvent, and water, wherein a mass ratio between the component (A) and the component (B), (B)/(A), is 0.08 or more and 0.84 or less.

4. The method according to claim 1, wherein the component (A) is an aliphatic alcohol with 10 carbons.

5. The method according to claim 1, wherein the component (B) is a polyoxyethylene sorbitan fatty acid monoester in which the fatty acid has 8 or more and 24 or less carbons and an average number of added moles of the ethylene oxide is 5 or more and 40 or less.

6. The method according to claim 1, wherein a total content of the components (A) and (B) in the disinfectant treatment liquid is 100 ppm or more and 900 ppm or less.

7. The method according to claim 2, wherein the component (C) is one or more solvents selected from the group

TABLE 3

| | | | Example | Comparative example | | |
| | | | 3-1 | 3-1 | 3-2 | 3-3 |
| | Type of fungi | | A1: 200 ppm | Daconil 1000: | A1: 200 ppm | A1: 200 ppm |
| | Technical name | Japanese name | B8: 80 ppm | 280 ppm | B'4: 80 ppm | B8: 200 ppm |
|---|---|---|---|---|---|---|
| Filamentous fungi | Cochliobolus miyabeanus | Brown spot disease in rice | ++ | − | − | ± |
| | Rhizoctonia solani | Damping-off of vegetables | ++ | − | − | ± |
| | Colletotrichum lagenarium | Anthracnose of cucumber | ++ | − | − | ± |
| | Altermaria brassicicola | Cabbage black leaf spot | ++ | − | − | ± |
| | Fusarium oxysporum | Aster yellows of daikon radish | ++ | − | − | ± |
| | Gibberella fujikuroi | Bakanae disease of rice | ++ | − | − | ± |
| | Valsa ceratosperma | Apple canker | +++ | ± | − | ± |
| | Botrytis allii | Onion neck rot | ++ | ± | − | ± |
| | Didymella bryoniae | Gummy stem blight of melon | ++ | − | − | ± |
| | Monilinia mali | Apple brown rot | +++ | − | − | ± |
| | Alternaria kikuchiana | Black spot disease of pear | ++ | ± | − | ± |
| | Cercospora beticola | Cercospora leaf spot of sugar beet | ++ | ± | − | ± |
| | Colletotrichum acutatum | Anthracnose of apple | +++ | ± | − | ± |
| Filamentous fungi (drug-resistant fungi) | Cercospora capsici | Frogeye spot on green pepper, imidazole-resistant | ++ | − | − | ± |
| | Botrytis cinerea | Gray mold of tomato, imidazole-resistant | ++ | − | − | ± |
| | Triticum aestivum | Eyespot of wheat, imidazole-resistant | ++ | ± | − | ± |
| Bacteria | Erwinia carotovora | Bacterial soft rot on taro | ++ | − | ± | ± |
| | Xanthomonas campestris | Peach shot hole disease | + | − | − | − |
| Mushroom | Coriolus versicolor | Kawaratake | ++ | ± | ± | ± |
| | Tyromyces palustris | Oouzuratake | ++ | ± | ± | ± |

The invention claimed is:

1. A method for disinfecting a plant, the method comprising applying to the plant a disinfectant treatment liquid, the disinfectant treatment liquid comprising, component (A), which is a straight-chain aliphatic alcohol with 8 or more and 12 or less carbons as a disinfectant consisting of propylene glycol, butanol, 2-ethylhexanol, benzyl alcohol and ethyl lactate.

8. The method according to claim 1, wherein a content of any agrochemical active ingredient selected from the group consisting of an active ingredient of a disinfectant, an active ingredient of an insecticide, an active ingredient of a miticide, and an active ingredient of a herbicide in the disinfectant treatment liquid is 100 ppm or less.

9. A method for killing a fungus, the method comprising performing the method according to claim 1, wherein the fungus is one or more fungi selected from the group consisting of filamentous fungi, chemical pesticide-resistant filamentous fungi, bacteria, and mushrooms.

10. A method for killing a fungus, the method comprising performing the method according to claim 1, wherein the fungus is one or more fungi selected from the group consisting of:

pathogenic filamentous fungi that cause plant diseases selected from the group consisting of brown spot disease in rice, damping-off of vegetables, anthracnose of cucumber, cabbage black leaf spot, bakanae disease of rice, anthracnose of apple, apple canker, apple brown rot, gummy stem blight of melon, aster yellows of daikon radish, onion neck rot, black spot disease of pear and *Cercospora* leaf spot of sugar beet;

pathogenic chemical pesticide-resistant filamentous fungi that cause plant diseases selected from the group consisting of *Alternaria* blotch of apple, frogeye spot on green pepper, gray mold of tomato and eyespot of wheat;

pathogenic bacteria that cause plant diseases selected from the group consisting of bacterial soft rot on qing-geng-cai, bacterial soft rot on taro and peach shot hole disease; and mushrooms selected from the group consisting of *Ganoderma*, Oouzuratake and Kawaratake.

11. A method for killing *Ganoderma*, the method comprising
performing the method according to claim 1.

12. A method for killing a fungus, the method comprising:
applying a disinfectant composition to a plant infected by the fungus, wherein the disinfectant composition comprises component (A), which is a straight-chain aliphatic alcohol with 8 or more and 12 or less carbons as a disinfectant component, and component (B), which is a polyoxyalkylene sorbitan fatty acid ester, wherein a mass ratio between the component (A) and the component (B), (B)/(A), is 0.08 or more and 0.84 or less, and wherein the fungus is one or more fungi selected from the group consisting of:

pathogenic filamentous fungi that cause plant diseases selected from the group consisting of brown spot disease in rice, damping-off of vegetables, anthracnose of cucumber, cabbage black leaf spot, bakanae disease of rice, anthracnose of apple, apple canker, apple brown rot, gummy stem blight of melon, aster yellows of daikon radish, onion neck rot, black spot disease of pear and *Cercospora* leaf spot of sugar beet;

pathogenic chemical pesticide-resistant filamentous fungi that cause plant diseases selected from the group consisting of *Alternaria* blotch of apple, frogeye spot on green pepper, gray mold of tomato and eyespot of wheat;

pathogenic bacteria that cause plant disease selected from the group consisting of bacterial soft rot on qing-geng-cai, bacterial soft rot on taro and peach shot hole disease; and mushrooms selected from the group consisting of *Ganoderma*, Oouzuratake and Kawaratake.

\* \* \* \* \*